United States Patent

Nieves et al.

[11] Patent Number: 5,323,079
[45] Date of Patent: Jun. 21, 1994

[54] HALF-COIL CONFIGURATION FOR STATOR

[75] Inventors: Abraham Nieves, Orlando; Charles Senic, Casselberry; Robert W. Ramsay, Oviedo, all of Fla.

[73] Assignee: Westinghouse Electric Corp., Pittsburgh, Pa.

[21] Appl. No.: 870,009

[22] Filed: Apr. 15, 1992

[51] Int. Cl.$^5$ ............................................. H02K 3/14
[52] U.S. Cl. .............................. 310/213; 310/60 A; 310/64; 310/179; 310/254
[58] Field of Search ................... 310/213, 260, 60 A, 310/64, 179, 55, 57, 254; 174/34; 336/187

[56] References Cited

U.S. PATENT DOCUMENTS

| Re. 27,489 | 9/1972 | Brenner | 310/213 |
|---|---|---|---|
| 1,144,252 | 6/1915 | Roebel | |
| 2,821,641 | 1/1958 | Ringland | 310/213 |
| 3,118,015 | 1/1964 | Willyoung | 174/33 |
| 3,188,377 | 6/1965 | Hughes | 174/33 |
| 3,280,244 | 10/1966 | Pannen | 174/34 |
| 3,381,154 | 4/1968 | Madsen | 310/213 |
| 3,602,751 | 8/1971 | Brenner | 310/213 |
| 3,647,932 | 3/1972 | Heller | 310/213 UX |
| 3,825,783 | 7/1974 | Duffert | 310/213 |
| 4,128,779 | 12/1978 | Salon | 310/213 |
| 4,308,476 | 12/1981 | Schuler | 310/213 |
| 4,381,467 | 4/1983 | Grunewald | 310/213 |
| 4,384,227 | 5/1983 | Kawai | 310/213 |
| 4,959,575 | 9/1990 | Saitoh | 310/213 |
| 5,051,642 | 9/1991 | Hediger | 310/260 |

FOREIGN PATENT DOCUMENTS

| 1913218 | 9/1970 | Fed. Rep. of Germany | 310/213 |
|---|---|---|---|
| 1913219 | 9/1970 | Fed. Rep. of Germany | 310/213 |
| 0952752 | 3/1964 | United Kingdom | 310/213 |

Primary Examiner—R. Skudy
Attorney, Agent, or Firm—G. R. Jarosik

[57] ABSTRACT

A half-coil for the stator winding of an electrodynamic system such as an electrical generator or motor includes an improved tube stack arrangement and a roebelling configuration which is designed to minimize power loss. The tube stack arrangement includes, in the disclosed embodiment, two central tube stacks and two roebel bars, one on each side of the tube stacks. By this arrangement, the individual strands in the roebel bars do not need to be transposed around the tube stacks, as was the case in prior art configurations utilizing more than one tube stack. The improved roebelling arrangement includes, in the disclosed embodiment, a total 720° transposition, including a 90° transposition in each of the two involute portions. To accomplish the 720° transposition in a limited space, the individual strands are combined into groups of two for a portion of the transposition.

15 Claims, 8 Drawing Sheets

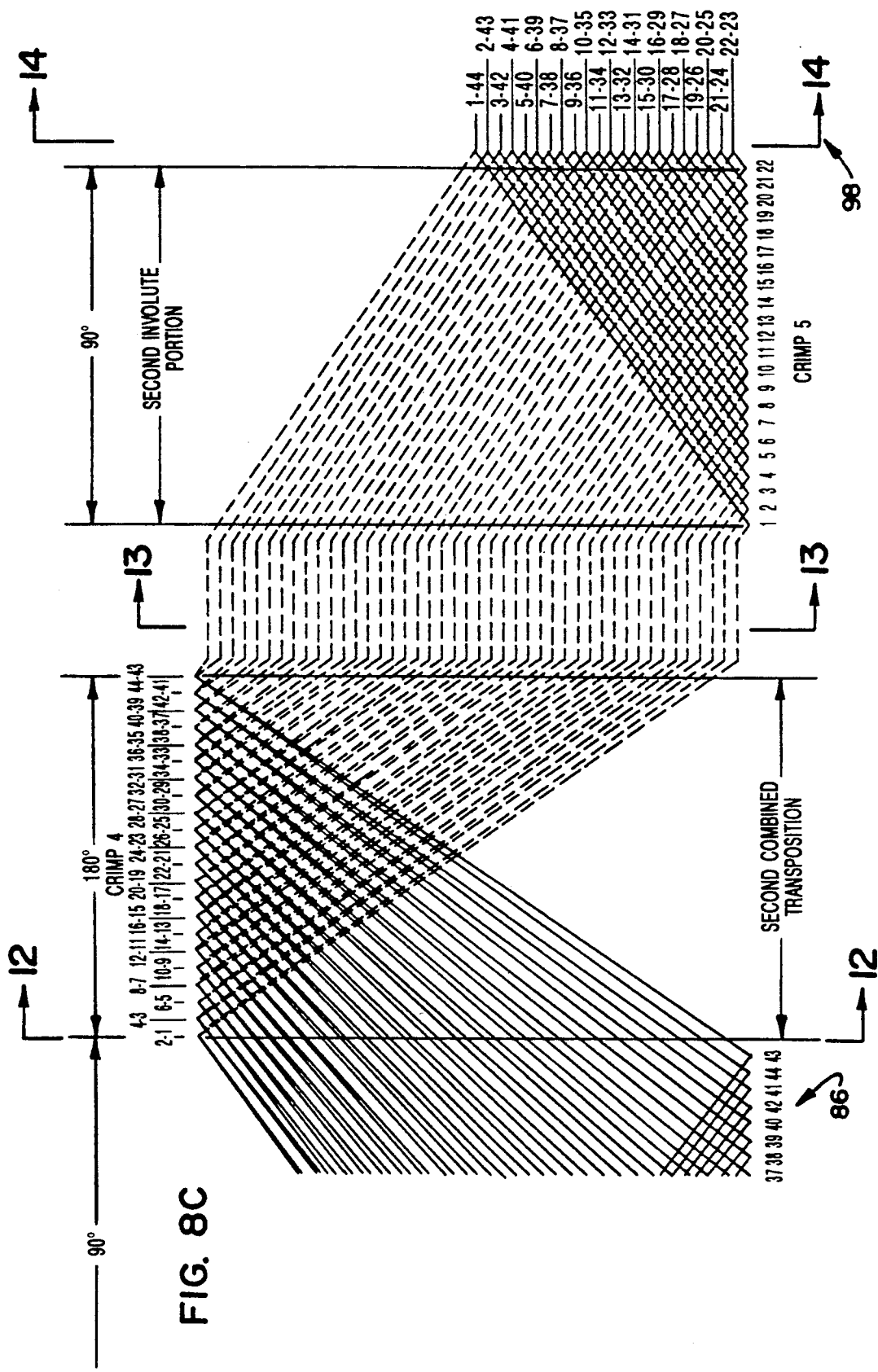

| | |
|---|---|
| 43 | 2 |
| 44 | 1 |
| 41 | 4 |
| 42 | 3 |
| 39 | 6 |
| 40 | 5 |
| 37 | 8 |
| 38 | 7 |
| 35 | 10 |
| 36 | 9 |
| 33 | 12 |
| 34 | 11 |
| 31 | 14 |
| 32 | 13 |
| 29 | 16 |
| 30 | 15 |
| 27 | 18 |
| 28 | 17 |
| 25 | 20 |
| 26 | 19 |
| 23 | 22 |
| 24 | 21 |
| 21 | 24 |
| 22 | 23 |
| 19 | 26 |
| 20 | 25 |
| 17 | 28 |
| 18 | 27 |
| 15 | 30 |
| 16 | 29 |
| 13 | 32 |
| 14 | 31 |
| 11 | 34 |
| 12 | 33 |
| 9 | 36 |
| 10 | 35 |
| 7 | 38 |
| 8 | 37 |
| 5 | 40 |
| 6 | 39 |
| 3 | 42 |
| 4 | 41 |
| 1 | 44 |
| 2 | 43 |

| | |
|---|---|
| 1 | 44 |
| 2 | 43 |
| 3 | 42 |
| 4 | 41 |
| 5 | 40 |
| 6 | 39 |
| 7 | 38 |
| 8 | 37 |
| 9 | 36 |
| 10 | 35 |
| 11 | 34 |
| 12 | 33 |
| 13 | 32 |
| 14 | 31 |
| 15 | 30 |
| 16 | 29 |
| 17 | 28 |
| 18 | 27 |
| 19 | 26 |
| 20 | 25 |
| 21 | 24 |
| 22 | 23 |
| 23 | 22 |
| 24 | 21 |
| 25 | 20 |
| 26 | 19 |
| 27 | 18 |
| 28 | 17 |
| 29 | 16 |
| 30 | 15 |
| 31 | 14 |
| 32 | 13 |
| 33 | 12 |
| 34 | 11 |
| 35 | 10 |
| 36 | 9 |
| 37 | 8 |
| 38 | 7 |
| 39 | 6 |
| 40 | 5 |
| 41 | 4 |
| 42 | 3 |
| 43 | 2 |
| 44 | 1 |

| | | | | |
|---|---|---|---|---|
| 22 | 23 | | 22 | 23 |
| 21 | 24 | | 21 | 24 |
| 20 | 25 | | 20 | 25 |
| 19 | 26 | | 19 | 26 |
| 18 | 27 | | 18 | 27 |
| 17 | 28 | | 17 | 28 |
| 16 | 29 | | 16 | 29 |
| 15 | 30 | | 15 | 30 |
| 14 | 31 | | 14 | 31 |
| 13 | 32 | | 13 | 32 |
| 12 | 33 | | 12 | 33 |
| 11 | 34 | | 11 | 34 |
| 10 | 35 | | 10 | 35 |
| 9 | 36 | | 9 | 36 |
| 8 | 37 | | 8 | 37 |
| 7 | 38 | | 7 | 38 |
| 6 | 39 | | 6 | 39 |
| 5 | 40 | | 5 | 40 |
| 4 | 41 | | 4 | 41 |
| 3 | 42 | VENT TUBES | 3 | 42 |
| 2 | 43 | | 2 | 43 |
| 1 | 44 | | 1 | 44 |
| 44 | 1 | | 44 | 1 |
| 43 | 2 | | 43 | 2 |
| 42 | 3 | | 42 | 3 |
| 41 | 4 | | 41 | 4 |
| 40 | 5 | | 40 | 5 |
| 39 | 6 | | 39 | 6 |
| 38 | 7 | | 38 | 7 |
| 37 | 8 | | 37 | 8 |
| 36 | 9 | | 36 | 9 |
| 35 | 10 | | 35 | 10 |
| 34 | 11 | | 34 | 11 |
| 33 | 12 | | 33 | 12 |
| 32 | 13 | | 32 | 13 |
| 31 | 14 | | 31 | 14 |
| 30 | 15 | | 30 | 15 |
| 29 | 16 | | 29 | 16 |
| 28 | 17 | | 28 | 17 |
| 27 | 18 | | 27 | 18 |
| 26 | 19 | | 26 | 19 |
| 25 | 20 | | 25 | 20 |
| 24 | 21 | | 24 | 21 |
| 23 | 22 | | 23 | 22 |

HALF-COIL CONFIGURATION FOR STATOR

FIELD OF THE INVENTION

This invention relates to an induction-type electrodynamic system such as an electrical generator or motor. More specifically, the invention relates to an improved roebelling configuration for a half-coil in a stator winding for such an electrodynamic system.

BACKGROUND OF THE INVENTION

Dynamoelectric machines such as the large electrical generators manufactured by Westinghouse Electric Company include multiple phase windings, which are positioned in slots in a laminated magnetic core. In such a generator, the movement of a rotor about an axis shifts a magnetic field which is associated with the rotor, thereby inducing a current to flow through each of the respective phase windings. Unfortunately, the convergence of magnetic flux from the rotor and from the windings themselves can cause additional induced voltage and eddy currents in the respective phase windings. Similar fluxes affect the end region or involute portions of the phase windings outside the slots. For this reason, the phase windings of large electrical generators are always of stranded construction, being built up of a substantial number of relatively thin strands to minimize the eddy current loss. The fluxes, however, are not uniform, but vary radially in density. The induced voltage thus varies from strand to strand, thereby causing excessive losses and heating if left untreated. To ameliorate this effect, it is common to transpose the strands in order to cancel out the unbalanced strand voltages. This tends to minimize the circulating currents and resultant heating. The most common type of transposition is that disclosed in U.S. Pat. No. 1,144,252 to Roebel.

In the stator of a gas inner-cooled electrodynamic power generator, coils are constructed of columns or stacks of copper strands and stacks of vent tubes, through which a coolant such as hydrogen gas is circulated. FIG. 1 is a cross-sectional view through a half-coil 10 of such a gas inner-cooled stator winding shown positioned in a slot of a stator 11. As may be seen in FIG. 1, the half-coil 10 includes a tube stack 12 of tubes 14 for circulating a coolant, wit of strand stacks 16, 18 and 20, 22, respectively, positioned on each side of the tube stack 12. Each of the strand stacks 16, 18, 20, 22 contain a plurality of individual strands 24, which are electrically insulated from each other and have a substantially rectangular cross-section to facilitate stacking. In such a half-coil 10, it is usual to transpose strand stack 16 with strand stack 18 and to transpose strand stack 20 with strand stack 22 to cancel out as far as possible the unbalanced voltages which might otherwise be generated between strands in the respective stacks.

Certain electrodynamic machinery requires more than one tube stack for conducting heat away from a half-coil of a stator winding. FIGS. 2 and 3 depict a half-coil configuration 26 which has been used in the past by Westinghouse Electric Company, the assignee hereof, for double tube stack applications. As shown in the cross-sectional view provided in FIG. 2, half-coil 26 included a first tube stack 28 positioned between a first strand stack 30 and a second strand stack 32. The assembly consisting of first strand stack 30, first tube stack 28 and second strand stack 32 was positioned immediately adjacent to a second assembly formed by second tube stack 34, third strand stack 36 and fourth strand stack 38. FIG. 3 depicts the transpositions 42 which were made between the first and second strand stacks 30, 32 and the third and fourth strand stacks 36, 38, respectively. As may be seen in FIG. 3, those transpositions were made about the respective tube stacks 28, 34, resulting in the creation of large spaces or voids 40 between the strand stacks. The voids 40 were two stacks in depth in some places, and tended to form an open chevron pattern along the length of the half-coil. To eliminate corona discharges within the coil insulation, it was necessary to fill the voids 40 with a dielectric material such as an impregnated dacron batting. This process, as might be imagined was extremely labor intensive. Moreover, the relative lack of density in the half-coil 26 that was caused by the voids 40 adversely affected the performance of the electrodynamic machinery.

To form a continuous coil, the various half-coils in an electrodynamic motor or generator are electrically connected at the end or involute portions of the slots. In the past, the half-coil ends were separated into specified groups of strands, which were cleaned, tinned, bundled into clips and soldered into series connectors to minimize power loss. This process was also labor intensive, time consuming and cumbersome.

It is clear that there has existed and long a unfilled need in the prior art for a half-coil configuration for use within the stator of an electrodynamic machine such as an electrical generator which includes more than one stack of cooling tubes, which achieves higher strand density with fewer void areas than was heretofore possible, and which is less labor intensive to install than those methods and systems heretofore known.

SUMMARY OF THE INVENTION

Accordingly, it is an object of the invention to provide an improved half-coil configuration for a stator winding in an electrodynamic system which contains more than one tube stack and achieves a higher degree of strand density with fewer void areas than was heretofore thought possible.

It is further an object of the invention to provide an improved half-coil configuration which is compatible with an improved end connection that requires less labor to install than previously known connections.

It is a third object of the invention to provide a half-coil configuration which provides easier access to the strands for consolidating the strands into an end connection.

In order to achieve the above and other objects of the invention, a tube stack arrangement for a half-coil of the type which is adapted for positioning in a slot of a stator in an electrodynamic system such as an electrical generator or motor includes, according to one aspect of the invention, at least two tube stacks, each of those tube stacks including a plurality of stacked vent tubes which are adapted for circulating a coolant such as hydrogen gas, the tube stacks being positioned adjacent to each other; a first roebel bar on a first side of the adjacent tube stacks, the first roebel bar including at least two strand stacks which are transposed to reduce current losses; and a second roebel bar on a second side of the adjacent tube stacks, the second roebel bar also including at least two strand stacks which are transposed to reduce current losses, whereby the cooling effect of more than one tube stack may be utilized without the disadvantages which are associated with transposing around the tube stacks.

According to a second aspect of the invention, a roebel bar for a half-coil of the type which is adapted for positioning in a slot of a stator in an electrodynamic system such as an electrical generator or motor includes a core portion which is sized to be received in a slot of a stator; a first involute portion which is axially connected to the core portion, the first involute portion being adapted for positioning outside of the stator slot adjacent to the end of the stator so as to be electrically connectable to another element; a second involute portion which is axially connected to the core portion at an opposite end from the first involute portion, the second involute portion also being adapted for positioning outside of the stator slot adjacent to the end of the stator so as to be electrically connectable to another element; the roebel bar including a plurality of conductive strands which extend to form said core portion and said first and second involute portions, the strands being transposed with respect to each other in the core portion and in at least one of the first and second involute portions to minimize power loss.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 8A, 8B and 8C are diagrammatical depictions of the full transposition configuration of a half-coil constructed according to the invention;

Figures 9, 10, 11:
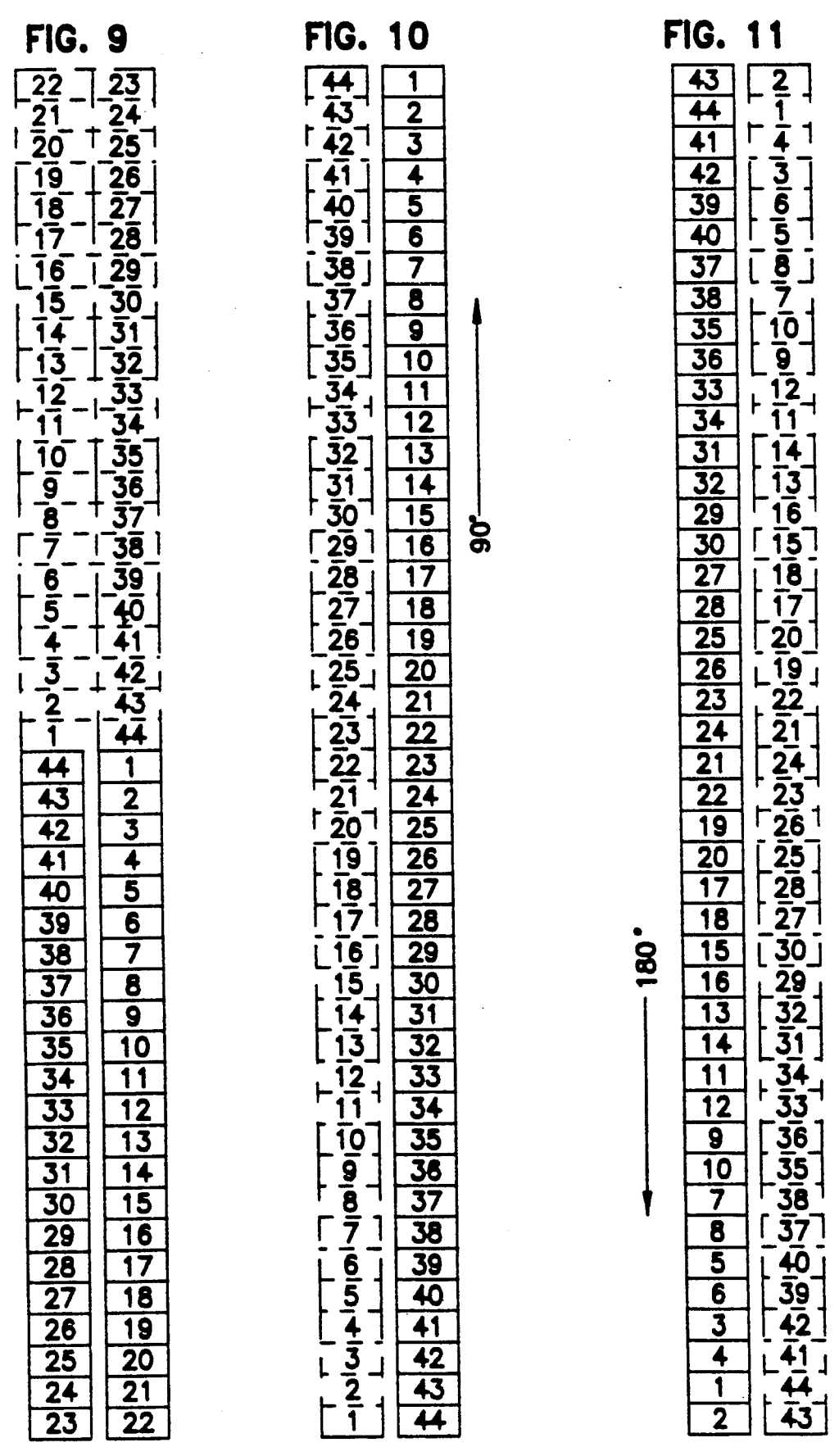

FIG. 9 is a diagram schematically depicting a first cross-section taken along line 9—9 of FIG. 8A;

FIG. 10 is a diagram schematically depicting a second cross-section taken along line 10—10 of FIG. 8A;

FIG. 11 is a diagram schematically depicting a third cross-section taken along line 11—11 of FIG. 8A;

FIG. 12 is a diagram schematically depicting a fourth cross-section taken along line 12—12 of FIG. 8B;

FIG. 13 is a diagram schematically depicting a fifth cross-section taken along line 13—13 of FIG. 8C; and FIG. 14 is a diagram schematically depicting a first end view of the transposition that is depicted in FIG. 8A.

DETAILED DESCRIPTION OF THE PREFERRED EMBODIMENT(S)

Figure 5:
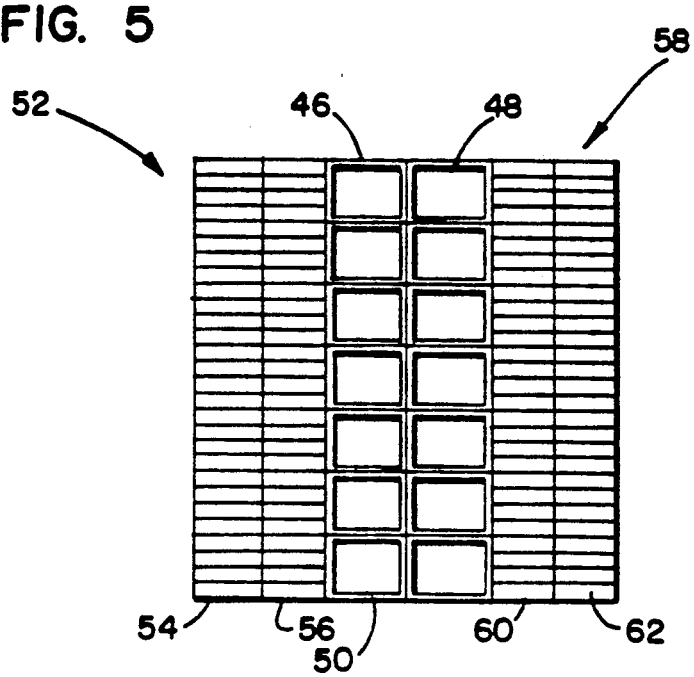
FIG. 5 is a cross-sectional view of the half-coil depicted in FIG. 4.
Figure 4:
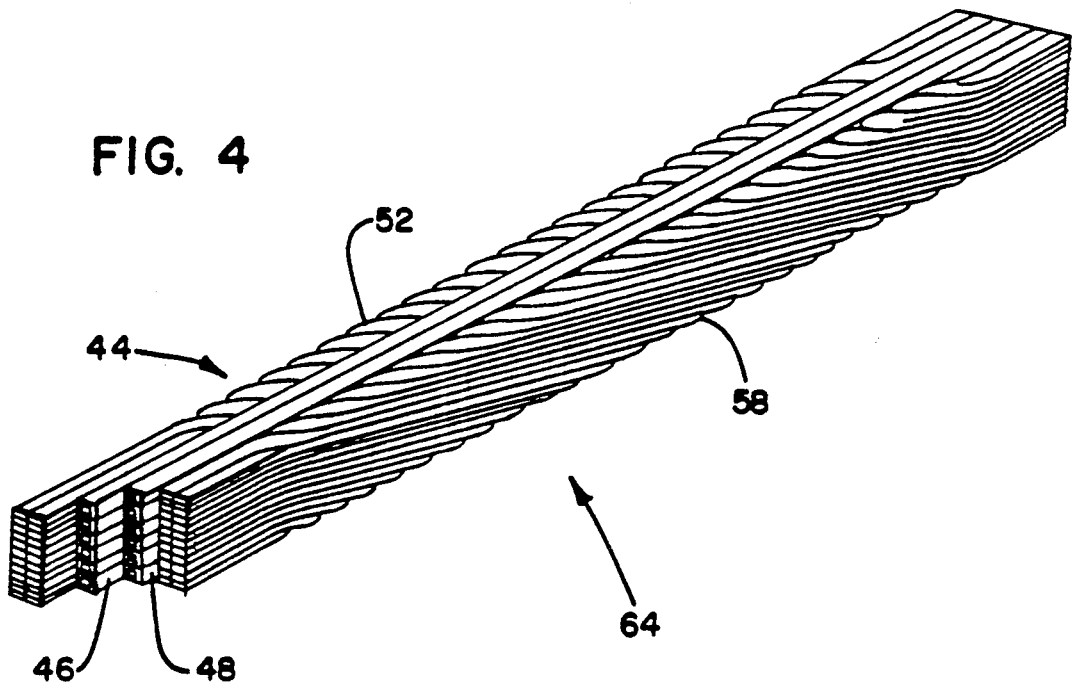
FIG. 4 is a perspective view of a half-coil constructed according to a preferred embodiment of the invention.

Referring now to the drawings, wherein like reference numerals designate corresponding structure throughout the views, and referring in particular to FIGS. 4 and 5, a half-coil 64 according to a preferred embodiment of the invention includes an improved tube stack arrangement 44. In improved tube stack arrangement 44, a first tube stack 46 and a second tube stack 48, each including a plurality of vent tubes 50, are positioned adjacent to each other. A first roebel bar 52 that includes a first strand stack 54 and a second strand stack 56 is positioned on one side of the adjacent tube stacks 46, 48. A second roebel bar 58 which includes a third strand stack 60 and a fourth strand stack 62 is positioned on a second, opposite side of the adjacent tube stacks 46, 48 from the first roebel bar 52.

Figure 1:
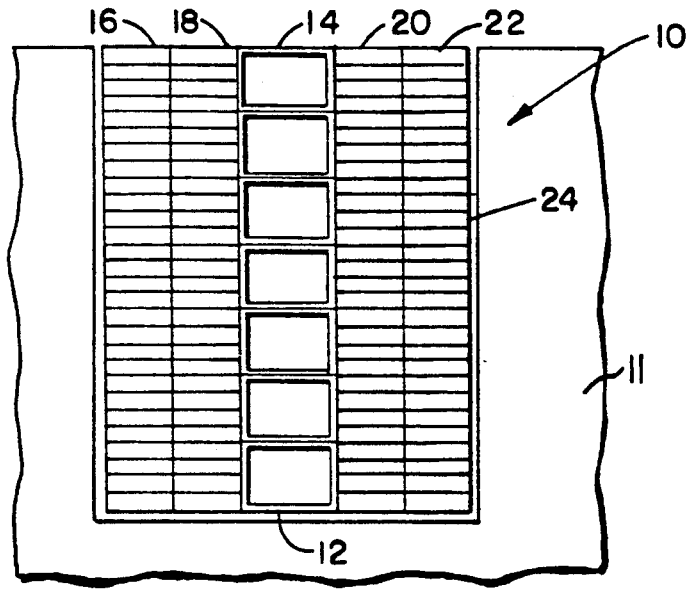
FIG. 1 is a cross-sectional view of a first prior art half-coil configuration.
Figure 2:
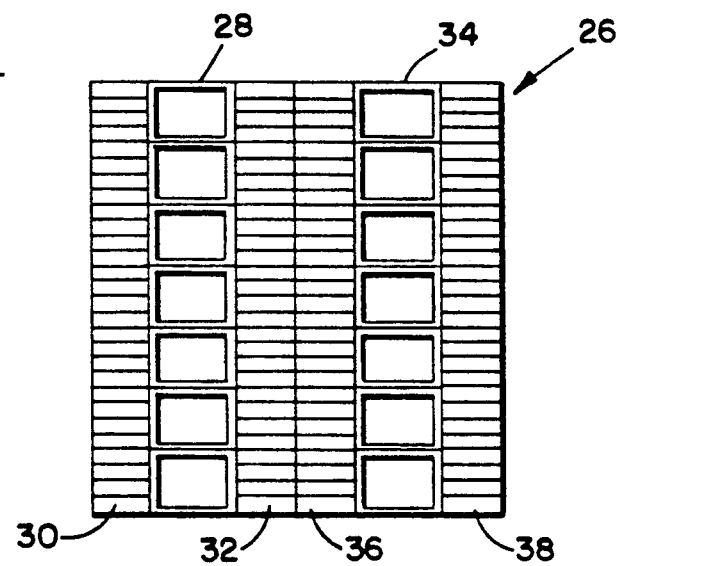
FIG. 2 is a cross-sectional view of a second prior art half-coil configuration.
Figure 3:
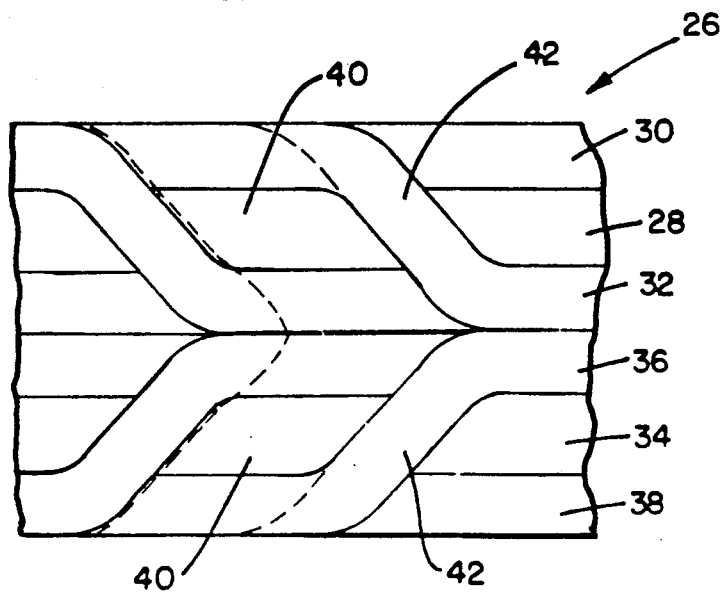
FIG. 3 is a fragmentary top plan view of the prior art half-coil configuration depicted in FIG. 2.

As may be seen in FIG. 4, the strands of first strand stack 54 are transposed with those of the second strand stack 56 in the first roebel bar, and the strands in the third stand stack 60 are transposed with those in the fourth strand stack 62 in the second roebel bar 58. As may be seen in FIG. 4, the transpositions between the respective strand stacks 54, 56 and 60, 62 does not involve transposing around the tube stacks 46, 48. As a result, the tube stack configuration of the present invention achieves a relatively high strand density in each of the roebel bars 52, 58, with virtually no voids being formed therein. Accordingly, the half-coil 64 does not require a dielectric material to be fitted therein along its length for the purpose of preventing corona discharges, as the prior art configuration shown in FIGS. 2 and 3 did. This eliminates the need for the custom dies that were previously required for cutting the dielectric material, for laborious die cutting, and the individual fitting of pieces dielectric batting. According to the invention, a dielectric material such as dacron batt is instead sheared into standarized strips and easily positioned along the half-coils before the half-coils are fitted into the stator slots. A further advantage which inheres from the central position of the vent tube stacks 46, 48 is that the vent tube stacks 46, 48 are less likely to interfere with the process of electrically connecting the individual strands at the involute portion of the stator.

Furthermore, the combined strength which is imparted to the half-coil 64 by the two adjacent tube stacks 46, 48 helps prevent tube collapse during the turning process which is required to make the transpositions in the roebel bars 52, 58.

Figure 6:
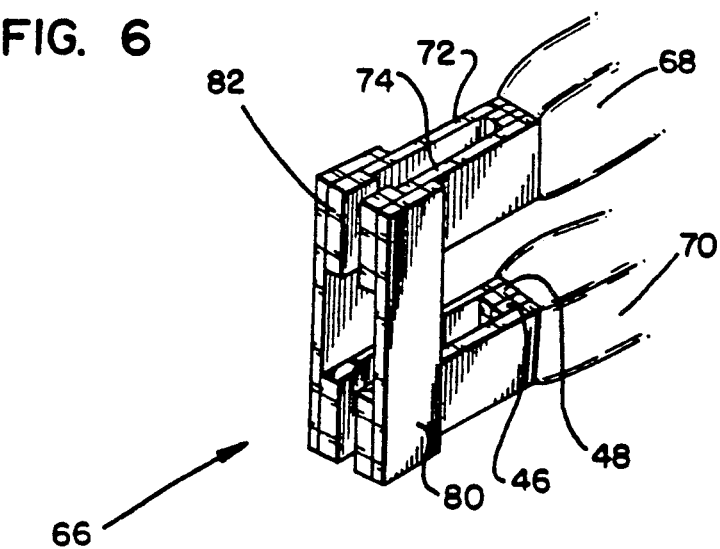
FIG. 6 is a perspective view of a connector constructed according to another aspect of the invention.

FIG. 6 depicts a solid series connector according to the invention, which allows the strands in a first half-coil 68 to be electrically connected to the strands in a second half-coil 70 with a minimum of labor when compared to prior art connections. In connector 66, the strand elements 72 which correspond to first roebel bar 52 are brazed to a conductive clip 82 which consolidates the strand ends, and the clip 82 is subsequently brazed to a copper conductor member 80. The conductor member 80 is in turn brazed, in another conductive clip, to a corresponding group of strands from the second half-coil 70 at a lower, second end. Similarly, a group of strands 74 which correspond to the second roebel bar 58 from first half-coil 68 are brazed to a conductor member 80, which is in turn braised at its lower end to a corresponding group of strands from the second half-coil 70. Tube stacks 46, 48 are also visible in FIG. 6.

The solid series connector 66 illustrated in FIG. 6 requires far less labor to install than the prior art group series connectors die. However, by eliminating the plurality of series connections that were used in the prior art connectors, the solid series connector 66 according to the invention is more susceptible to power losses caused by circulating currents and resultant heating. To offset this effect, the present invention provides an improved half-coil roebelling configuration 84, which is depicted in FIGS. 7-14 of the drawings.

Figure 7:
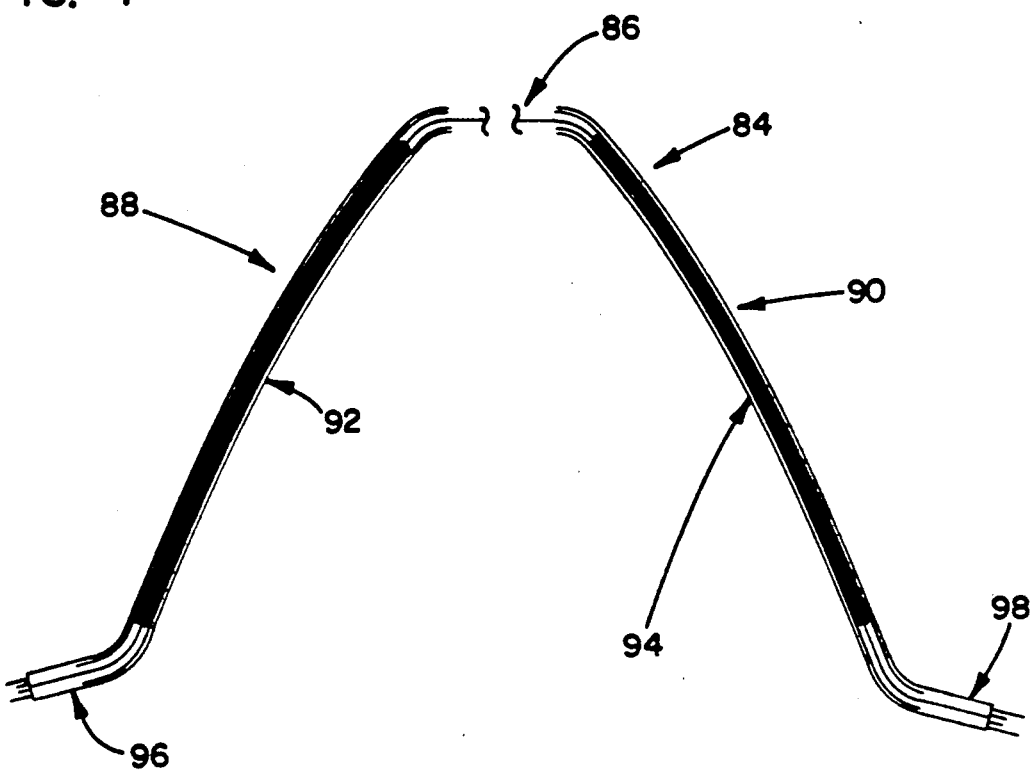
FIG. 7 is a diagrammatical view depicting another aspect of a half-coil constructed according to the invention.

Referring briefly to FIG. 7, a roebel bar in half-coil 84 includes a core portion 86 which is sized to be received in a slot of a stator, and a first involute portion 88 which is coextensive with the core portion 86. The first involute portion 88 is adapted for positioning outside of the stator slot adjacent to the end of the stator, so as to be electrically connectable to another element, such as a second half-coil, or to a phase end connector. Half-coil roebel bar 84 further includes a second involute portion 90 which is coextensive with the core portion 86 at an opposite end of the stator assembly from the first involute portion 88. The second involute portion 90 is also adapted for positioning outside of the stator slot adjacent to an opposite end of the stator from the first involute portion 88. The first and second involute portions 88, 90 respectively include first and second arcuate portions 92, 94, in which the strand stacks therein are transposed to cancel out unbalanced strand voltages in the involute areas. The involute portions 88, 90 also include, respectively, first and second connector ends 96, 98, which are adapted to be connected to another half-coil or another electrical element.

Figure 8A:
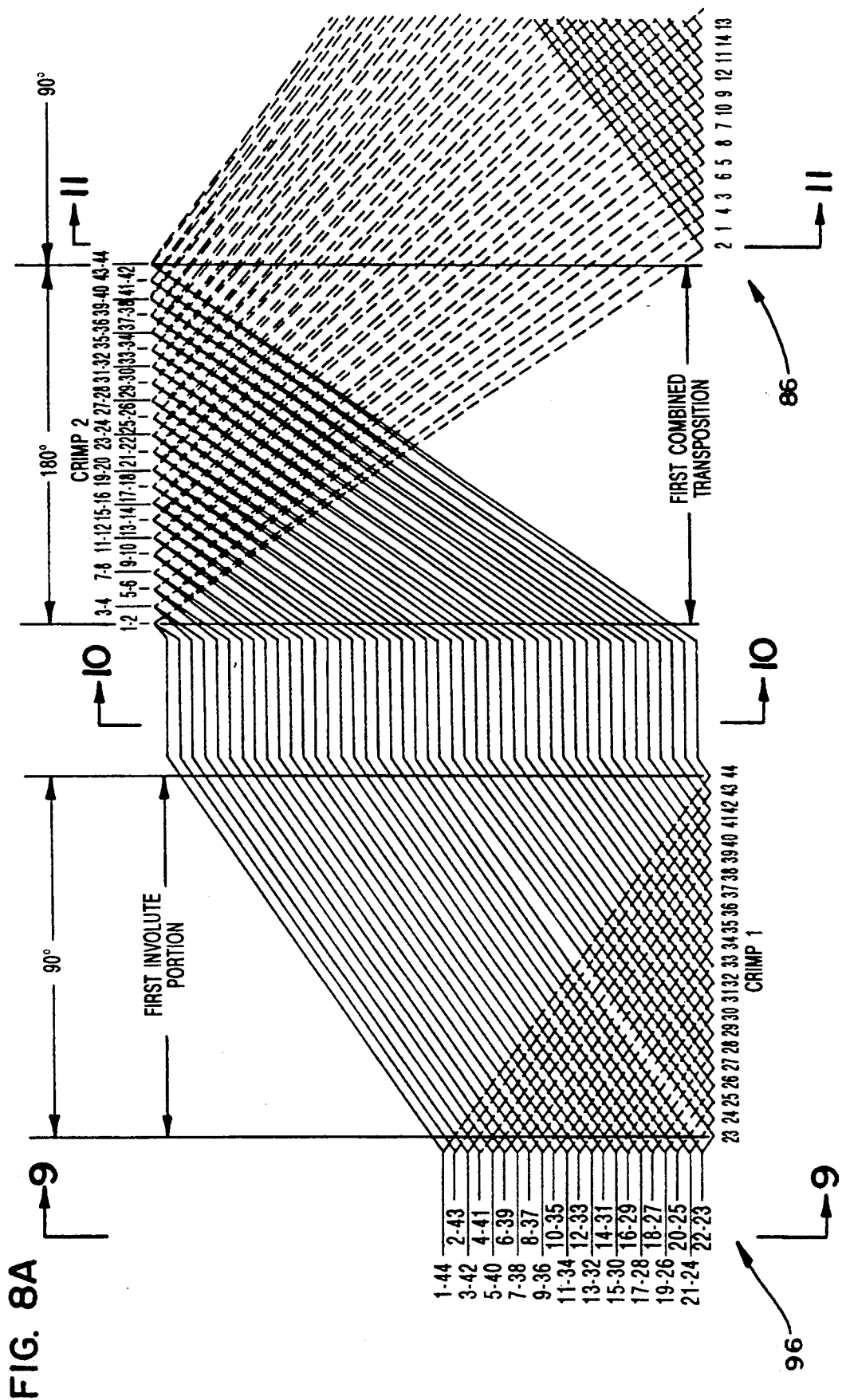
Figure 8B:
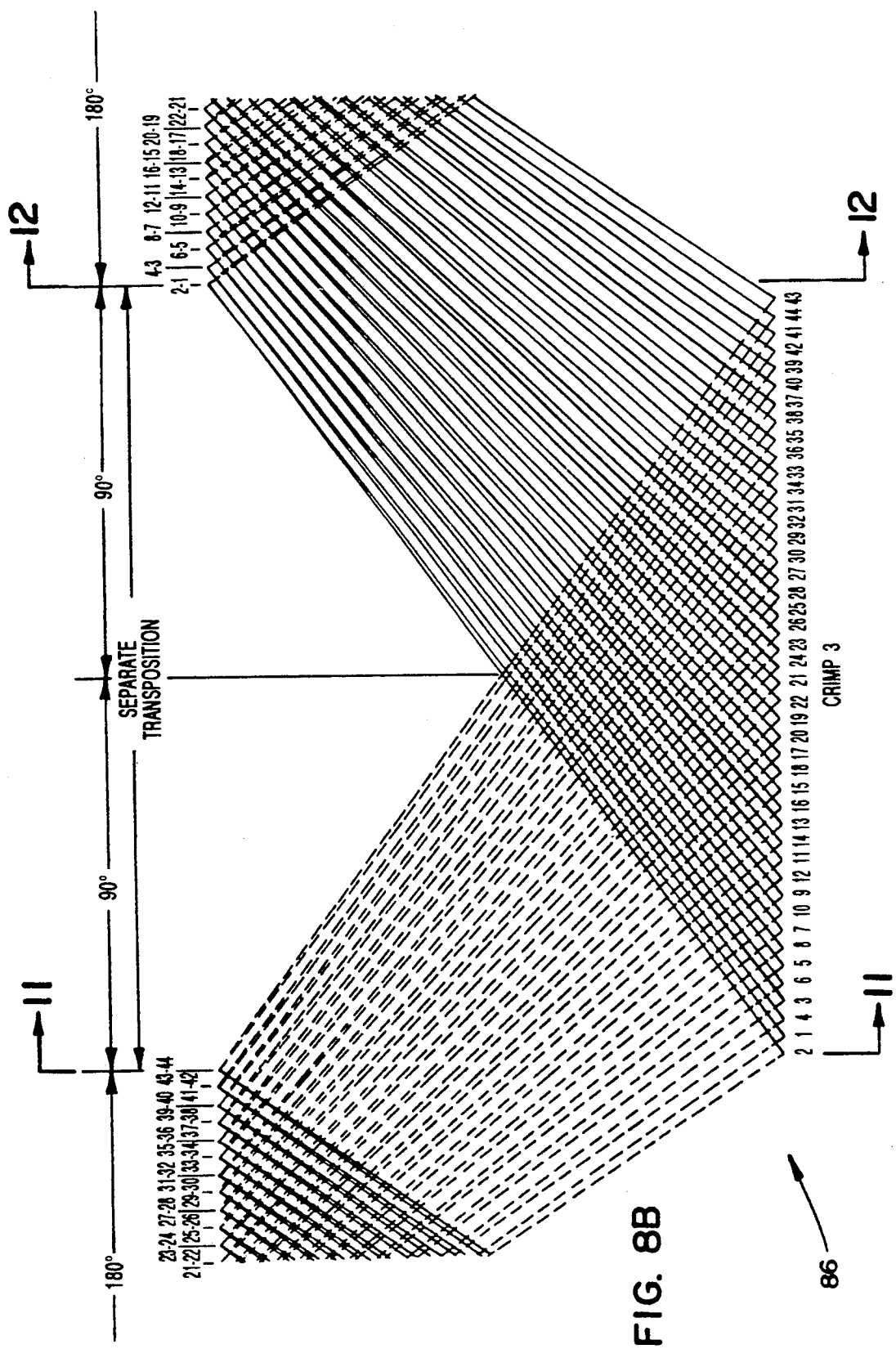

FIGS. 8A-8C diagrammatically illustrate the transposition configuration of each of the roebel bars in a half-coil constructed according to the preferred embodiment of the invention. According to one important aspect of the invention, each of the strands in such a roebel bar is configured to make a total transposition of 720°. This includes a 90° transposition in the first involute portion 88, a 540° transposition in the core portion 86, and a 90° transposition in the second involute portion 90.

According to one important aspect of the invention, the individual strands, which are labeled from 1 to 44 in FIGS. 8A-8C, are combined into groups for a first combined transposition and a second combined transposition, which are indicated in FIGS. 8A-8C. The first combined transposition occurs in the first 180° of the core portion 86, shown in FIG. 8A, and the second combined transposition occurs in the last 180° of core portion 86 which is shown in FIG. 8C. In the illustrated embodiment, it will be seen that the groups into which the strands are combined each contain two strands. The purpose of the first and second combined transpositions is to allow the 720° transposition to be accomplished in the limited space that is provided within the portion of the stator slot that is allotted for each of the roebel bars.

FIGS. 9-13 schematically depict the position of the respective strands that are numbered 1-44 in FIGS. 8A-8C at different stages of the 720° transposition. FIG. 14 represents an end view of an entire roebel bar taken from the end of the transposition that is depicted in FIG. 8A.

The 720° roebelling configuration of the present invention reduces power loss and heating when compared to prior art configurations. This increased efficiency permits the use of the solid series connector 66 without a reduction in coil efficiency as compared to prior art designs, while retaining the substantial labor savings that are provided by the solid series connector 66. The roebelling configuration of the invention is particularly well suited for use in short cores, as the result of the transposition of two strands in half of the core. This combined transposition permits the use of a larger number of strands, which further increases the efficiency of the system.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A tube stack arrangement for a half-coil of the type which is adapted for positioning in a slot of a stator in an electrodynamic system, comprising:
   at least two tube stacks, each of said tube stacks comprising a plurality of stacked vent tubes which are adapted for circulating a coolant, said tube stacks being positioned adjacent to each other;
   a first roebel bar comprising at least two strand stacks which are transposed to reduce current losses wherein said first roebel bar is positioned adjacent a first side of said tube stacks; and
   a second roebel bar comprising at least two strand stacks which are transposed to reduce current losses, wherein said second roebel bar is positioned adjacent a second side of said tube stacks.

2. A tube stack arrangement according to claim 1, wherein said tube stacks are bonded together with said first and second roebel bars.

3. A tube stack arrangement according to claim 2, wherein said bonding is with an epoxy-treated dacron.

4. A tube stack arrangement according to claim 1, wherein each of said first and second roebel bars is substantially rectangular is cross-section.

5. A roebel bar for a half-coil of the type which is adapted for positioning in a slot of a stator in an electrodynamic system, comprising:
   a core portion which is sized to be received in a slot of a stator;
   a first involute portion which is axially connected to said core portion, said first involute portion being adapted for positioning outside of the stator slot adjacent to a first end of the stator so as to be electrically connectable to another element;
   a second involute portion which is axially connected to said core portion at an opposite end from said first involute portion, said second involute portion also being adapted for positioning outside of the stator slot adjacent to a second end of the stator so as to be electrically connectable to another element;
   said roebel bar comprising a plurality of conductive strands which extend to form said core portion and said first and second involute portions, said strands being transposed with respect to each other in said core portion and in at least one of said first and second involute portions to minimize power loss;
   wherein each of said strands is configured to make a total transposition of 720°.

6. A roebel bar according to claim 5, wherein each of said strands is configured to make a transposition of 90° in at least one of said first and second involute portions.

7. A roebel bar according to claim 6, wherein each of said strands is configured to make a transportation of 90° in each of said involute portions.

8. A roebel bar according to claim 5, wherein said first or second involute section comprises an arc-shaped portion in which said transposition occurs.

9. A roebel according to claim 5, wherein each of said strands is combined into one of a plurality of strand groups prior to a transposition, thereby permitting a greater number of strands to be transposed in a given distance.

10. A roebel bar according to claim 9, wherein each of said strands is combined into each of said strand groups in said core portions.

11. A roebel bar according to claim 9, wherein each of said strand group is separated into single strands after transposition.

12. A roebel bar according to claim 9, wherein each of said strand groups contain at least two of said conductive strands.

13. A roebel bar according to claim 9, wherein each of said strands is combined into one of a plurality of strand groups and thence separated in two separate instances in said core portion.

14. A roebel bar according to claim 13, wherein each of said strands is transposed a total of 540° in said core portion, and each of said strand groups are transposed for a period of 180° in each instance.

15. A roebel bar according to claim 13, wherein said two instances of strand groups are positioned at first and second opposite ends of said core portion.

* * * * *